United States Patent Office 2,984,878
Patented May 23, 1961

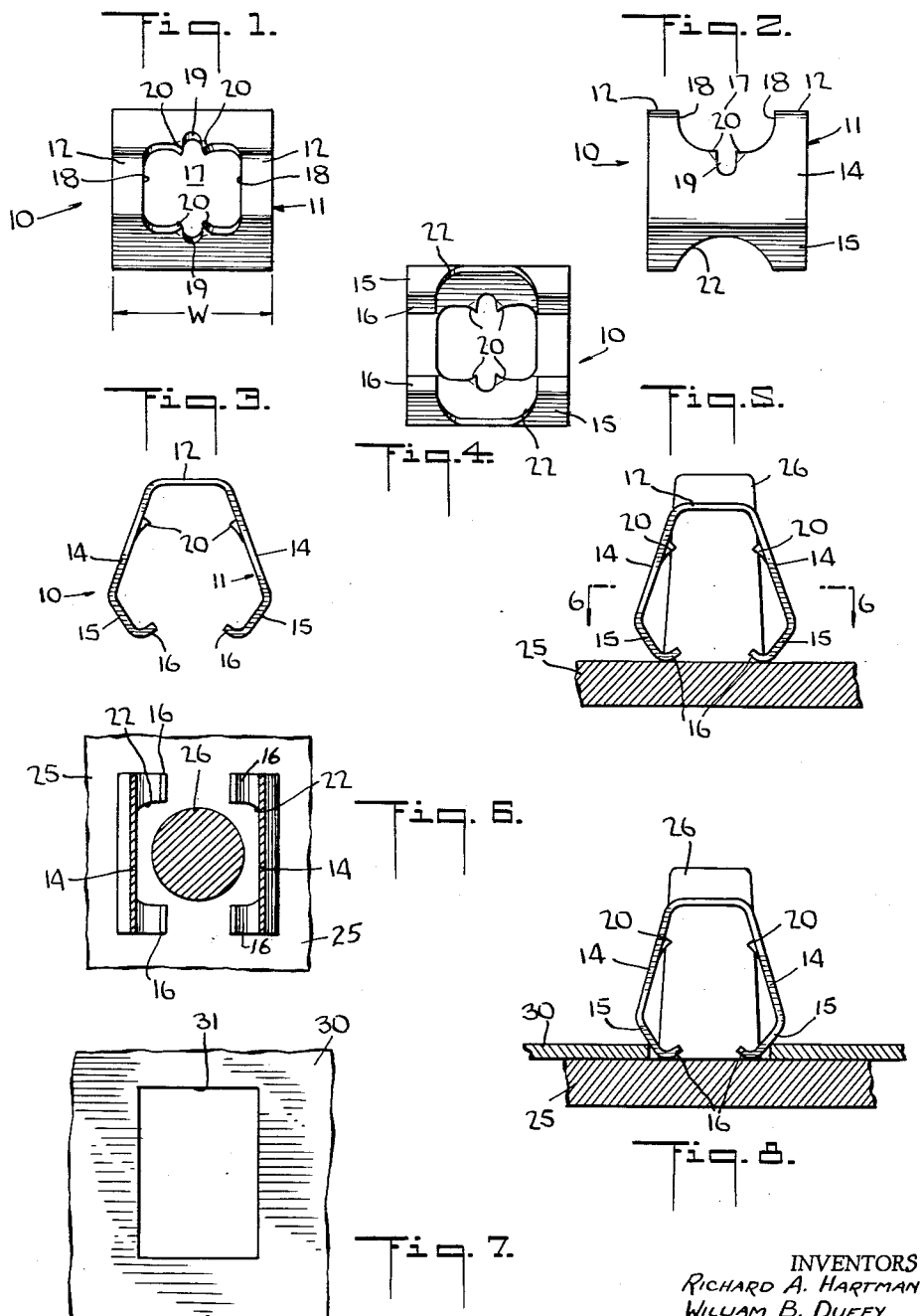

---

2,984,878

PUSH-IN ASSEMBLY AND FASTENER THEREFOR

Richard A. Hartman, Madison, and William B. Duffy, Berkeley Heights, N.J., assignors to The Palnut Company, Mountainside, N.J., a corporation of New Jersey Filed July 31, 1958, Ser. No. 752,244

11 Claims. (Cl. 24—73)

This invention relates to a push-in assembly and fastener therefor.

Objects and advantages of the invention will be apparent from the disclosure hereof including the drawing. While we are setting forth the best mode which we have thus far contemplated of carrying out our invention, the disclosure hereof is by way of illustration and example since the invention has various applications and lends itself to embodiments other than the embodiment disclosed herein.

Our invention is defined in the claims. In the claims, as well as in the description, parts may at times be identified by specific names for ease of reference and ready understanding, but such nomenclature is to be understood as having the broadest meaning consistent with the context and with the concept of our invention as distinguished from the pertinent prior art. Where parts are, for clarity and convenience, referred to on the basis of their oriented position shown in the drawing or in any other oriented position, no limitation as to the positioning of the entire structure is to be inferred, since the entire structure may be inverted or be placed in any inclined position.

Fig. 1 is a top plan view, on an enlarged scale, of a fastener of the invention that we have made for a stud having a nominal diameter of 3/16".

Fig. 2 is a side view of the fastener shown in Fig. 1, looking from the bottom of Fig. 1.

Fig. 3 is an edge view of the fastener shown in Fig. 1, looking either from the right or the left of Fig. 1.

Fig. 4 is a bottom plan view of the fastener shown in Fig. 1.

Fig. 5 is a fragmentary sectional elevation showing a subassembly in which a stud-carrying member has the fastener of Figs. 1–4 applied thereto preparatory to affixing the member to a support.

Fig. 6 is a section on the line 6—6 of Fig. 5.

Fig. 7 is a fragmentary view showing a support having an aperture therein to receive the subassembly of Fig. 5. The view is one looking toward the face of the support.

Fig. 8 is a sectional elevation showing the subassembly of Fig. 5 assembled with the support of Fig. 7.

The fastener 10 is formed in one piece and is a strip-like piece of sheet metal. This piece is designated as a whole by 11 and, for convenience, will be referred to as a strip. The strip has a width W and a length corresponding to the peripheral length shown in Fig. 3. We have formed the fastener with the grain of the metal running in the direction of the width W.

The strip 11 is bent into a configuration similar to an arrowhead, having a flat top 12, diverging flat legs 14, 14, converging flat legs 15, 15, and upturned ends 16, 16.

At the top of the fastener the strip 11 is provided with an opening 17 having longitudinal edges 18, 18 which extend parallel to the longitudinal edges of the strip and which run down into the legs 14, 14, as is seen in Fig. 2. The transverse edges of the opening 17 are formed as shown in Figs. 1 and 2, being centrally recessed at 19, 19 to provide small triangles at 20, four in number. These small triangles are bent inwardly somewhat from the plane of the legs 14, 14 and the apex of each triangle is very sharp, whereby each triangle 20 constitutes a barb.

The ends of the strip 11 are provided with central arcuate recesses 22, 22 which extend to the junctures of legs 14 and 15.

In Fig. 5 there is shown a member 25 having an integral stud 26 projecting from the rear thereof. The member 25 may be, for example, a plastic or die-cast ornament or trim member that is to be attached to the dash or body of an automobile. The member 25 may be of considerable dimension and may have a plurality of studs 26 distributed over it, each stud being fastened in the manner herein disclosed for one stud.

Preparatory to mounting the member 25 on a support, the fastener 10 is forcibly telescoped onto the stud 26 and brought into contact with the back of the member 25. The barbs 20 dig into the stud 26 and make holding engagement therewith. The forked ends 16, 16 of the fastener are positioned astride of the stud 26 with the bottoms of the recesses 22, 22 in spaced relation to the stud.

The subassembly of Fig. 5 is adapted for mounting the member 25 on a support 30 (Fig. 7) having a rectangular aperture 31. The support 30 may, for example, be an automobile dash or other body part. To mount the member 25 on the support 30, the stud-and-fastener assembly of Fig. 5 is forcibly inserted through the aperture 31, the legs 14, 14 engaging the long edges of aperture 31 and being cammed inwardly as the fastener passes through the support 30. Then the legs spring outwardly to the position shown in Fig. 8.

The upper ends of the legs 14, 14 are tied together by the top 12 of the fastener. As the fastener is forced through the aperture 31, these legs constitute levers which act with a leverage of from 2:1 to 3:1 to force the barbs 20 into the stud 26. In the completed assembly shown in Fig. 8 the legs are still held flexed inwardly from their unstressed position and, therefore, maintain firm engagement between the prongs 20 and the stud 26. Also, due to the resilient reaction of the legs, the legs 15, 15 exert constant camming force on the edges of the support 30. Thus, the member 25 is constantly urged against the face of the support 30 by spring action, thereby obviating the development of looseness and rattle.

We make the fastener 10 of spring steel, hardened and tempered after forming. The fastener shown in the drawing is one for a stud of 3/16" nominal diameter. For a fastener of this size, to be used with a sheet-steel support .033" to .048" thick, we have made the fastener of spring steel .017" thick and have used 5/16" for the width W, .195" for the distance between edges 18, 18, 5/16" for the over-all vertical height of the fastener, 5/32" for the dimension of top 12 measured lengthwise of the strip 11, 5/64" for the vertical distance between the upper surface of top 12 and the points of the barbs 20, 5/64" for the vertical distance between the junctures of legs 14 and 15 and the bottom of the fastener, 5/16" for the distance between the outside surfaces of the junctures of legs 14 and 15, 7/32" for the horizontal distance between the lowermost flat portions of the two legs 15, 15, .010" for the perpendicular distance between the points of the barbs and the inner surfaces of the legs 14, 14, .010" for the inside radius of curvatures at the junctures of top 12 with legs 14, 14 and at the junctures of legs 14, 14 with legs 15, 15 and at the junctures of legs 15, 15 with ends 16, 16, 5/64" for the width of recesses 19, 19, .165" for the diameter of a circle which inscribes the points of barbs 20, and 3/64" for the perpendicular distance between the outer planes of legs 15, 15 and the tips of ends 16, 16.

In connection with the fastener having the dimensions aforesaid, we have given the aperture 31 in the support a length of .328" and a width of .234". With such aperture the fastener substantially spans the length of the aperture and pivotal movement of the fastener in the aperture is prevented.

We contemplate the use of square studs for positive indexing. Also, we anticipate disposing legs 15, 15 parallel to the surface of support 30 or nearly so, thereby substantially preventing removal of the stud once the assembly of Fig. 8 has been made.

We claim:

1. In an assembly of support and member mounted thereon in which a stud extends from the member and projects through a hole in the support, and a spring fastener engages the stud and urges it in the direction away from the member, the improvement which comprises: the fastener being a strip of springy sheet metal having a central opening through which the stud passes, the strip being formed into a configuration similar to an arrowhead with the central opening of the strip at the forward end of the arrowhead formation, portions of the strip engaging the support on the side thereof opposite to the member, the ends of the strip being inturned toward each other and the inturned portions being centrally recessed and extending astride of the stud, the longitudinal portions of the strip that extend in opposite directions from the central opening of the strip constituting a pair of spring legs which are connected together at a location remote from the support and on the side thereof opposite to the member, the legs having barbs which make holding engagement with the stud, and the legs acting with leverage to hold the barbs in firm engagement with the stud.

2. An assembly as in claim 1 in which the opening in the support is rectangular and the ends of the strip of sheet metal substantially span the length of the rectangle.

3. An assembly as in claim 2 in which the strip of sheet metal is of rectangular cross section and portions of the strip adjacent to the ends thereof extend into the opening in the support and make contact with the member from which the stud projects.

4. In an assembly of stud-carrying member and fastener for attaching the member to a support by telescoping the stud and fastener through a hole in the support, the stud projecting from the member and thereby having a base attached to the member and a free end remote from the member, the improvement which comprises: the fastener being a one-piece strip of springy sheet metal and having an apertured central portion through which the stud passes, the strip being formed into a configuration similar to an arrowhead, said central portion of the strip being the forward end of the arrowhead formation and the arrowhead formation being directed toward the free end of the stud, and the fastener having opposed legs which are connected together at one end by said central portion and which extend toward the base of the stud, each leg being provided along its length with a plurality of barbs which engage the stud at different circumferential locations, the legs having free ends adjacent to the base of the stud and the free ends of the legs being inturned towards each other, the inturned portions being centrally recessed and extending astride of the stud near the base thereof.

5. An assembly as in claim 4 in which the bottoms of the recesses in the inturned portions of the legs are in spaced relation to the stud.

6. In a fastener for attaching a stud-carrying member to a support by telescoping the stud and fastener through a hole in the support, the stud projecting from the member and thereby having a base attached to the member and a free end remote from the member, the improvement which comprises: the fastener being a one-piece strip of springy sheet metal and having an apertured central portion to receive the stud and embrace the same at a location remote from the base of the stud, the strip being formed into a configuration similar to an arrowhead, the forward end of the arrowhead formation being the central portion of the strip that is to receive the stud and embrace it at a location remote from the base of the stud, and the fastener having opposed legs which are connected to said central portion and are adapted to extend toward the base of the stud with their free ends adjacent to the base of the stud, each leg being provided along its length with a pair of stud-engaging barbs, the two barbs of each pair being located at the same distance from said central portion of the fastener and being laterally spaced for engaging the stud at different circumferential locations, and the ends of the strip being inturned toward each other and the inturned portions being centrally recessed to extend astride of the stud adjacent to the base of the stud.

7. A fastener as in claim 6 in which the strip of sheet metal is of rectangular cross section.

8. In an assembly of support and member mounted thereon in which a stud extends from the member and projects through a hole in the support, and a spring fastener engages the stud and urges it in the direction away from the member, the improvement which comprises: the spring fastener having an apertured central portion through which the stud passes and which embraces the stud at a location remote from the support, the fastener having a configuration similar to an arrowhead and said central portion constituting the forward end of the arrowhead formation, the fastener having opposed spring legs connected to said central portion and having free ends located adjacent to the support, the free ends of the legs being turned inwardly toward the axis of the stud and making camming engagement with the margin of the hole in the support, such engagement holding the free ends of the legs displaced inwardly from their unstressed position, and the legs having stud-engaging barbs, the barbs being located along the lengths of the legs at a distance from the ends thereof, and the legs acting with leverage to maintain the barbs in firm engagement with the stud.

9. An assembly as in claim 8 in which the stud-engaging barbs include a plurality of barbs on each leg, the barbs on each leg being located at the same distance from the forward end of the arrowhead formation and engaging the stud at different circumferential locations.

10. An assembly as in claim 9 in which the legs act with a leverage of from 2:1 to 3:1 in holding the barbs in engagement with the stud.

11. An assembly as in claim 8 in which the legs act with a leverage of from 2:1 to 3:1 in holding the barbs in engagement with the stud.

References Cited in the file of this patent

UNITED STATES PATENTS

| | | |
|---|---|---|
| 2,275,773 | Kost | Mar. 10, 1942 |
| 2,322,656 | Murphy | June 22, 1943 |
| 2,327,328 | Murphy | Aug. 17, 1943 |
| 2,329,688 | Bedford | Sept. 21, 1943 |
| 2,430,555 | Burke | Nov. 11, 1947 |
| 2,712,465 | Tinnerman | July 5, 1955 |

FOREIGN PATENTS

| | | |
|---|---|---|
| 815,152 | Germany | Sept. 27, 1951 |
| 931,235 | France | July 24, 1946 |
| 1,123,297 | France | June 4, 1956 |